US006494440B2

(12) United States Patent
Bosmans et al.

(10) Patent No.: US 6,494,440 B2
(45) Date of Patent: Dec. 17, 2002

(54) GAS-LIQUID CONTACTING TRAY

(75) Inventors: Bernardinus Henricus Bosmans, Amsterdam (NL); Gerrit Konijn, Amsterdam (NL); Karel Antonius Kusters, Amsterdam (NL)

(73) Assignee: Shell Oil Company, Houston, TX (US)

( * ) Notice: Subject to any disclaimer, the term of this patent is extended or adjusted under 35 U.S.C. 154(b) by 7 days.

(21) Appl. No.: 09/757,889

(22) Filed: Jan. 10, 2001

(65) Prior Publication Data

US 2001/0015504 A1 Aug. 23, 2001

(30) Foreign Application Priority Data

Feb. 16, 2000 (EP) .............................. 00200522

(51) Int. Cl.[7] ................................. B01F 3/04
(52) U.S. Cl. ................. 261/114.1; 261/114.5
(58) Field of Search .................... 261/114.1, 114.2, 261/114.3, 114.4, 114.5

(56) References Cited

U.S. PATENT DOCUMENTS

| | | | | |
|---|---|---|---|---|
| 2,960,322 A | * | 11/1960 | Eld | |
| 4,496,430 A | * | 1/1985 | Jenkins | 261/114.5 |
| 4,550,000 A | * | 10/1985 | Bentham | 261/114.1 |
| 4,582,569 A | | 4/1986 | Jenkins | |
| 4,627,941 A | * | 12/1986 | Bentham | 261/114.1 |
| 5,230,839 A | * | 7/1993 | Sampath et al. | 261/114.1 |
| 5,382,390 A | * | 1/1995 | Resetarits et al. | 261/114.3 |
| 5,702,647 A | | 12/1997 | Lee et al. | |
| 2001/0047921 A1 | * | 12/2001 | Bravo | 196/14.52 |

FOREIGN PATENT DOCUMENTS

| | | | |
|---|---|---|---|
| GB | 1422131 | | 1/1976 |
| WO | 9737741 | * | 10/1997 |
| WO | 9828056 | * | 7/1998 |

OTHER PUBLICATIONS

H. Z. Kister "Distilllation Design", pp. 260–267.*
International Search Report of Jul. 3, 2001.

* cited by examiner

Primary Examiner—C. Scott Bushey

(57) ABSTRACT

A gas-liquid contacting column is described with a number of axially spaced trays, each having two sections separated along a diametrical line on the tray, and having a number of parallel rectangular downcomers, open at the upper end and closed at the bottom end, which has a number of liquid discharge openings, and a number of liquid receiving areas with bubble area between them. The liquid receiving area is positioned just below the downcomer of a consecutive tray just above. The downcomers extend from the diametrical line to the circumferential of the tray such that the ends of the downcomers of the two tray sections are positioned along the diametrical line in an alternating manner, wherein the area of the liquid discharge openings per downcomer length as viewed from below and close to the diametrical line is less than that as viewed from below.

12 Claims, 2 Drawing Sheets

GAS-LIQUID CONTACTING TRAY

FIELD OF THE INVENTION

The invention is related to a gas-liquid contacting column provided with a plurality of axially spaced trays, each tray having two tray sections separated along a diametrical line on the tray, each tray section comprising a plurality of parallel rectangular downcomers, a plurality of liquid receiving areas and bubble area between the downcomers and the liquid receiving areas, which liquid receiving area is positioned just below the downcomer of a consecutive tray just above and which downcomers are open at the upper end and closed at the bottom end, which bottom end is provided with a plurality of liquid discharge openings and which downcomers extend from the diametrical line to the circumferential of the tray in such a manner that the ends of the downcomers of the two tray sections are positioned along the diametrical line in an alternating manner.

BACKGROUND OF THE INVENTION

Such a gas-liquid contacting column is described in GB-A-1422131. This publication from 1976 describes such a column being provided with a plurality of gas-liquid contacting trays, wherein the rectangular downcomers have vertical walls. The tray is divided by a supporting beam along a diametrical line in two tray sections. Each tray section has a row of parallel rectangular downcomers arranged perpendicular to the supporting beam. The row of downcomers in one section are staggered relative to the row of downcomers in the opposite tray section. According to this publication the staggering tray layout promotes an even distribution of the liquid over the entire tray.

Although the tray as described in GB-A-1422131 has proven to be a good gas-liquid contacting tray in many applications there is room for improvement. A problem often encountered with this design is a reduced contacting efficiency of the upwardly moving gas with the downwardly moving liquid. The object of the present invention is to provide a gas-liquid tray which incorporates the advantages of the tray as described in GB-A-1422131 with a higher efficiency.

SUMMARY OF THE INVENTION

This object is achieved with the following gas-liquid contacting column. Gas-liquid contacting column provided with a plurality of axially spaced trays, each tray having two tray sections separated along a diametrical line on the tray, each tray section comprising a plurality of parallel rectangular downcomers, a plurality of liquid receiving areas and bubble area between the downcomers and the liquid receiving areas, which liquid receiving area is positioned just below the downcomer of a consecutive tray just above and which downcomers are open at the upper end and closed at the bottom end, which bottom end is provided with a plurality of liquid discharge openings and which downcomers extend from the diametrical line to the circumferential of the tray in such a manner that the ends of the downcomers of the two tray sections are positioned along the diametrical line in an alternating manner, wherein the area of the liquid discharge openings per downcomer length as viewed from below and close to the diametrical line is less than the average area of the liquid discharge openings per downcomer length as viewed from below.

Applicants have found that by varying the liquid discharge openings along the downcomer lower end according to the invention a higher gas-liquid contacting efficiency is achieved. With close to the diametrical line is preferably meant a distance of 0.2 m.

BRIEF DESCRIPTION OF THE FIGURES

The invention shall be further illustrated by making use of FIGS. 1–3.

DETAILED DESCRIPTION OF THE INVENTION

Figure 1:
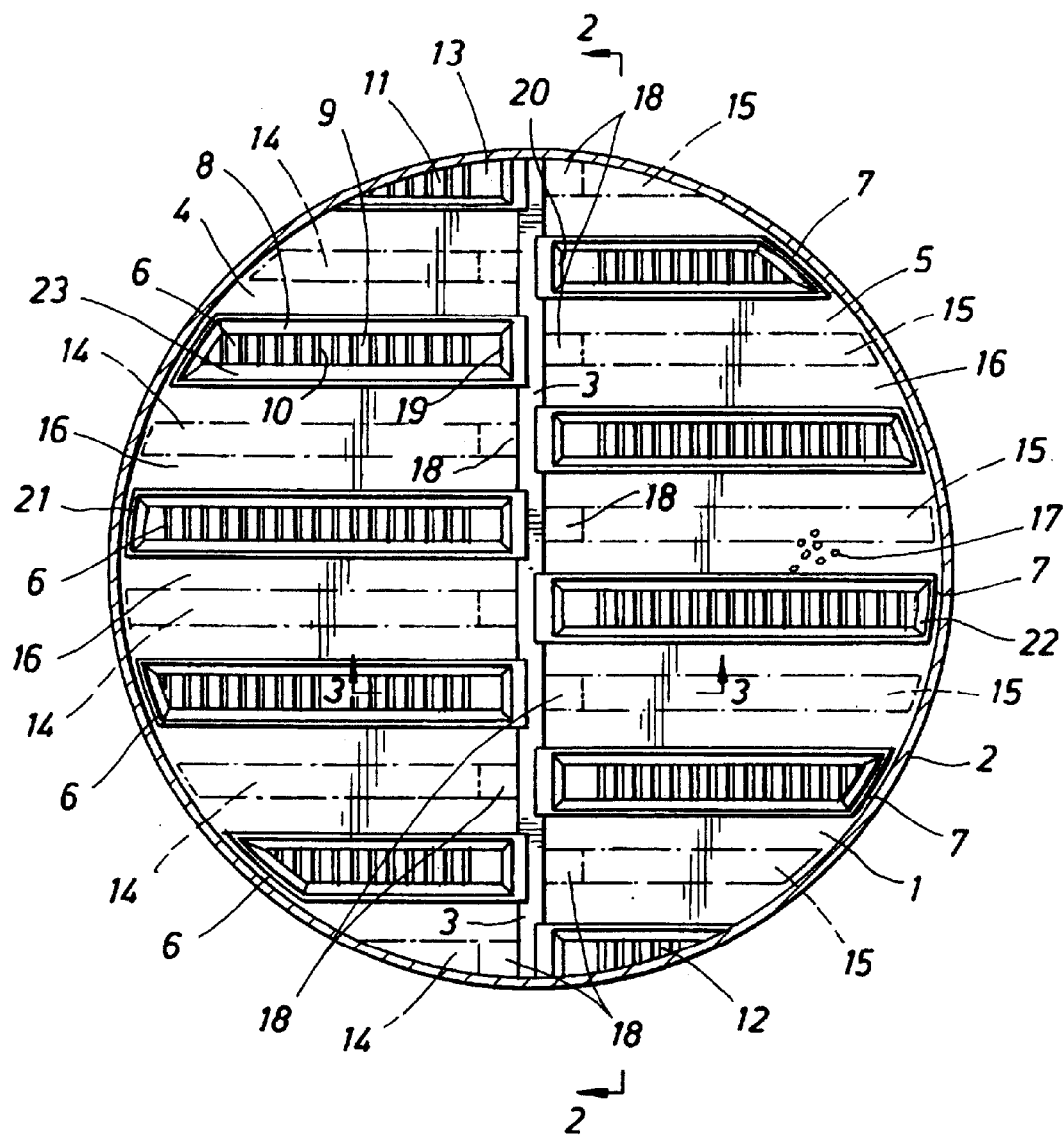
FIG. 1 is a top view of a tray according to the invention as placed in a column.

FIG. 1 shows a horizontal cross-sectional view of a gas-liquid contacting column. In this figure a top view of a tray 1 and the column wall 2 is illustrated. Tray 1 is provided with a supporting beam 3 along the diametrical line dividing the tray in two tray sections 4,5. Such a supporting beam is preferably present in trays having a large diameter, preferably having a diameter of above 2 m. Smaller diameter trays can be used without a supporting beam. Each tray section 4,5 is provided with a plurality of parallel rectangular downcomers 6,7. The downcomers 6,7 have two elongated sides along its length and two smaller sides along its width. The downcomers 6,7 are open at the upper end 8 and closed at the bottom end 9, which bottom end 9 is provided with a plurality of liquid discharge openings 10. The shape of these openings may for example be circular or have the form of slits parallel or perpendicular to the widths of the downcomer. Each tray section 4,5 is further provided with a segmental downcomer 11,12 also provided with a bottom end which bottom end is provided with liquid discharge openings 13.

Each tray section 4,5 is provided with liquid receiving areas 14,15. The liquid receiving area 14,15 is the area just below the rectangular and the optional segmental downcomers of the tray just above the illustrated tray 1 in FIG. 1. Between the liquid receiving area 14,15 and the downcomer 6,7 bubble area 16 is present. Bubble area 16 is provided with openings 17 for passage of upwardly moving gas.

This liquid receiving area 14,15 may also be provided with openings for gas passage. Because the liquid being discharged from the tray above will fall on this liquid receiving area with some force, liquid may pass these gas openings. Because this is not desirable the liquid receiving area is either provided with no openings or with special gas openings, for example floating or fixed valves. Another example of such special openings are described in U.S. Pat. No. 5,702,647. If the liquid discharge openings 10 are grouped, the part of the liquid receiving area not directly below these grouped liquid discharge openings may be provided with additional gas openings, for example the same openings as used in the bubble area 16.

In a preferred embodiment of the invention additional gas openings are present in the liquid receiving area 14,15 close to the supporting beam 3 in section 18 as illustrated in FIG. 1. These openings can be the same as used in the bubble area 16. Because almost no liquid is discharged onto this area 18 from the consecutive upper tray in a column according to the invention, it is possible to provide additional gas-liquid contact area in areas 18 on the tray. This is advantageous because liquid flowing from a downcomer in one tray section to the downcomer opening in the opposite tray section in a lower tray will thus be contacted with upwardly moving gas, thereby increasing the gas-liquid contacting efficiency.

The downcomers 6,7 extend perpendicular from the supporting beam 3 to the circumferential of the tray 1. Downcomer ends 19,20 of both tray sections 4,5 meet the supporting beam 3 in an alternating manner. The opposite ends 21,22 nearest the wall can be parallel to ends 11,12 or follow the circumferential of the tray, in for example a straight or curved line, in order to optimise downcomer opening area. As can be seen in FIG. 1 less liquid discharge openings 10 are present near the downcomer ends 19,20 resulting in that the area of the liquid discharge openings per downcomer length close to the supporting beam is smaller than the average area of the liquid discharge openings per downcomer length. Preferably no liquid discharge openings are present close to the supporting beam 3.

FIG. 1 shows so-called sloped downcomers, meaning that the downward directed downcomer walls along its length are sloped, such that these elongated walls 23 are inclined towards each other in a downward direction. This is advantageous because the width of the liquid discharge area of a downcomer will be reduced, resulting in that the associated width of the liquid receiving area 14,15 on the tray just below will also be reduced.

In addition to the illustrated trays having sloped downcomer walls downcomers having vertical walls may also be used in combination with the tray according to the invention. According to textbooks like "Distillation Operation" by Henry Z. Kister, McGraw-Hill Inc, 1990, pages 173–175, the ratio of the cross sectional area at tray level to the cross sectional area at the bottom of a sloped downcomer is between 1.5 and 2.0.

Figure 2:
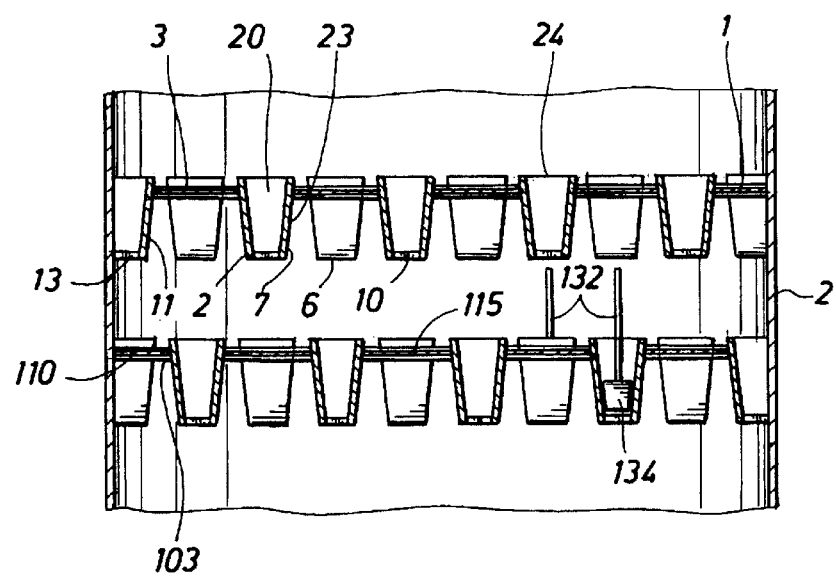
FIG. 2 is a cross-sectional view AA' of FIG. 1.

FIG. 2 shows a cross-sectional view AA' of the column of FIG. 1 illustrating two trays 1,101 directly positioned above each other. The trays 1,101 are mirrored along the supporting beam 3,103. This results in that the liquid discharge openings 10 of tray 1 are vertically placed above liquid receiving area 115 of tray 101 just below.

FIG. 2 shows a cross-section of downcomers 7 placed in tray section 5 and a side view of downcomers 6 placed in tray section 4. Downcomer 7 has two sloped walls 23 and at its end 20 a side wall 24 at the supporting beam 3. As shown the side wall 24 is vertically positioned.

Figure 3:
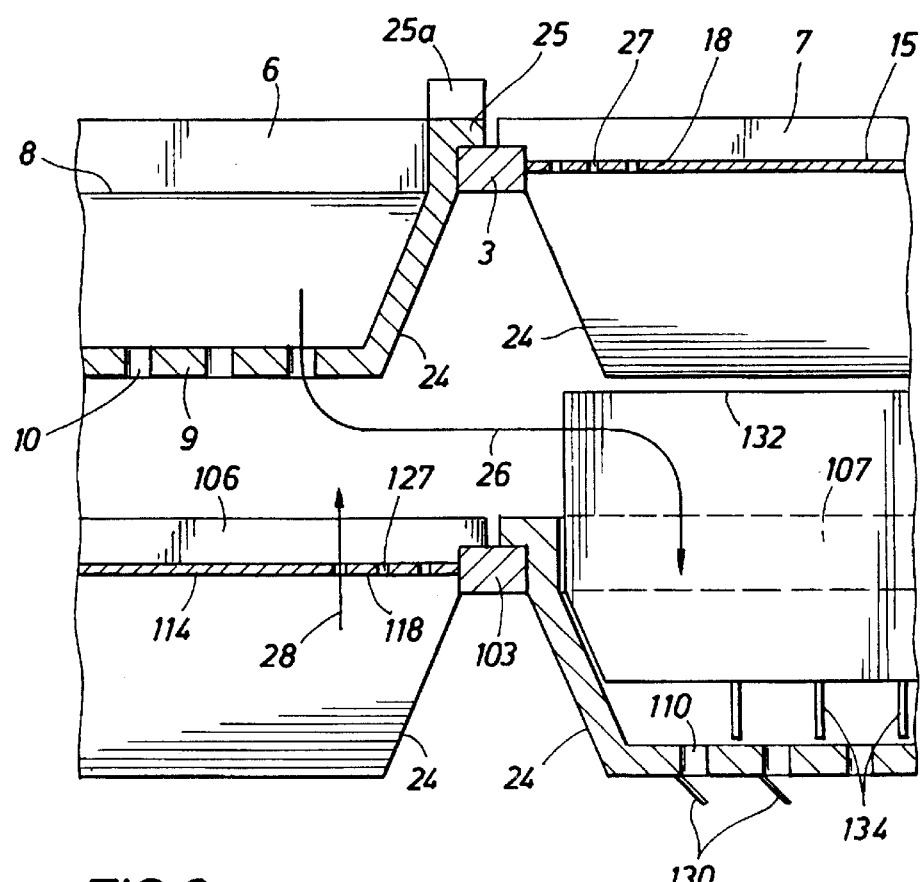
FIG. 3 is a cross-sectional view BB' of FIG. 1.

FIG. 3 also shows another preferred embodiment which may be used in combination with the column according to the invention. FIG. 3 is a cross-sectional view along part of line BB' of FIG. 1 illustrating two consecutive trays 1,101 in column 2 (not shown) near to the supporting beams 3,103. Side walls 24 are sloped such that the lower part of side wall 24 points away from the supporting beam. Due to the sloping of this side wall 24 no liquid discharge openings will be present in the part of the downcomer close to the supporting beam and a somewhat directional flow is created in the first liquid discharge openings 10,110 nearest the supporting beam 3,103. Because the direction of the discharged liquid will point away from the supporting beam 3,103 and because of the increased distance to the supporting beam 3 less by-pass 26 of liquid flowing from downcomer 6 into downcomer 107 of the tray 101 just below results. The angle which side wall 24 makes with an imaginary vertical plane through supporting beam 3 is preferably between 10 and 35 degrees. FIG. 3 also shows liquid receiving areas 15,114 having an area 18,118 close to the supporting beam 3,103 which is provided with gas openings 27,127 in order to increase the contacting of liquid flow 26 and the upwardly moving gas 28 through these openings 27,127.

FIG. 3 also shows a preferred embodiment wherein a weir 25 is present on the downcomer which extends above the tray level. The weir 25 is a device positioned on or about on the boundary of the bubble area 16 and the downcomer 6,7 which ensures that a certain pre-selected amount of liquid is present on the bubble area 16. In an even more preferred embodiment (shown dashed with reference numeral 25a in FIG. 3) part of weir 25 at the downcomer ends 19,20 extends more above the tray 1 than the rest of the weir 25. This even further reduces by-pass 26.

In a further preferred embodiment (shown on tray 101 in FIG. 3) the liquid discharge openings 10 nearest the supporting beam 3 are provided with a flow directing lip 130, directing the liquid flow away from the imaginary vertical plane through the supporting beam 3. Because of the flow directing lip 130, which may be easily fabricated by stamping from the metal plate of which the downcomer is made, less area from below will be observed nearest the supporting beam 3. This will further result in that less by-pass 26 will be observed.

The diameter of the tray may be between 1.5 and 10 m. The number of rectangular downcomers per tray section may be between 1 and 10. Additionally segmented downcomers are suitably present at the intersection of the supporting beam and the circumferential of the tray. A downcomer preferably extends to between 50 and 90% of the tray spacing below the tray. Tray spacing is defined as the distance between two consecutive contact trays in the column. Suitably the tray spacing is between 0.2 and 1 m.

For the present invention it is not critical which kind of openings are used in the bubble area of the tray. Examples of possible openings are bubble cap openings, sieve tray openings, valve tray openings and fixed valve openings. Examples of these openings can be found in general text books such as *Distillation Design*, Henry Z. Kister, McGraw-Hill Inc, 1992, page 260–267 and in US-RE-27908, U.S. Pat. No. 5,120,474, WO-A-9828056, WO-A-9737741, U.S. Pat. No. 5,911,922, U.S. Pat. No. 3,463,464 and U.S. Pat. No. 5,454,989.

The downcomer is preferably provided with a rectangular shaped baffle 132 vertically positioned along the longitudinal centre in the opening of the downcomer, which is schematically shown on selected downcomers of the lower tray 101 in FIG. 2 and FIG. 3. This anti-jump baffle plate 132 preferably extends to between 30 and 70% of the tray spacing above the tray level. The lower end may extend from tray level to the downcomer lower end. The anti-jump baffle is suitably supported from both sides by supports which are fixed to the inside of the downcomer walls.

It has further been found advantageous to provide the downcomer with so-called anti-sloshing baffles 134, which are schematically shown on selected downcomers of the lower tray 101 in FIG. 2 and FIG. 3. Applicants have found that when vertical plates 134 spaced apart from each other and arranged parallel to the width of the downcomer are present in the lower half of the downcomer less sloshing will occur. Sloshing occurs especially in elongated downcomers, especially in downcomers longer than 0.5 m as measured at tray level, where liquid moves from one end to the other and back These plates may extend a certain distance from the inner side of the downcomer wall or may optionally extend all the way to the opposite downcomer wall. In the last embodiment the anti-sloshing baffles 134 will also add to the mechanical strength of the downcomer itself. In an even more preferred embodiment the anti-sloshing baffles are at the same time the supports for the above described anti-jump baffle.

The column according to the invention is preferably used as a gas-liquid contacting or separation column. Contacting can be absorption processes wherein a downwardly moving liquid is contacted with an upwardly moving gas. Separation is typically a distillation process to separate one or more components from a feed. Typically the feed of a distillation process is supplied to an intermediate position in the column, wherein trays are present above and below said inlet position. Such a column is further provided with reboiler, condensation and reflux means.

The invention shall be illustrated by the following non-limiting Example.

EXAMPLE 1

The efficiency was calculated of a tray according to FIG. 1 with a tray diameter of 2.44 m and equipped with 8 rectangular downcomers having no liquid discharge openings in the first 0.2 m of the downcomer as seen from the diametrical line. The calculated efficiency is 90%. The calculations were performed using the tray efficiency model as published in the *Chemical Engineering Journal*, Volume 63, pages 167–180 (1996) "The effect of downcomer layout pattern on tray efficiency" in combination with experimental observations.

Comparative Example A

Example 1 was repeated except that additional liquid discharge openings were present in the first 0.2 m of the downcomer as seen from the diametrical line. An efficiency was calculated of 85%.

We claim:

1. A gas-liquid contacting column comprising:
    a plurality of axially spaced trays, each tray comprising:
        two tray sections separated along a diametrical line on the tray;
        a plurality of parallel rectangular downcomers within the tray sections having a width and a length comprising:
            an upper half;
            an upper end in the upper half;
            a lower half; and,
            a bottom end in the lower half comprising a plurality of liquid discharge openings;
        wherein the downcomers extend from a diametrical line of the tray to a circumferential of the tray in such a manner wherein the ends of the downcomers of two tray sections are positioned along the diametrical line in an alternating manner;
        a plurality of liquid receiving areas positioned just below the downcomer of a consecutive tray just above; and,
        a bubble area between the downcomers and the liquid receiving areas, wherein the area of the liquid discharge openings per downcomer length as viewed from below and close to the diametrical line is less than the average area of the liquid discharge openings per downcomer length as viewed from below.

2. The column of claim 1, further comprising openings on the tray close to the diametrical line and just below the downcomer of the consecutive tray just above.

3. The column of claim 1, in which the area of the liquid discharge openings per downcomer length as viewed from below and 0.2 m from the diametrical line is less than the average area of the liquid discharge openings per downcomer length as viewed from below.

4. The column of claim 1, in which the two elongated walls of the downcomer and the wall nearest the diametrical line are sloped such that they are inclined towards each other in a downward direction.

5. The column of claim 1, further comprising a weir along a boundary of the downcomer opening and the bubble area, which weir has a part at the downcomer ends nearest the diametrical line extending more above the tray than the rest of the weir.

6. The column of claim 1, in which the liquid discharge openings close to the diametrical line are provided with a flow directing lip, directing the liquid flow away from an imaginary vertical plane through the diametrical line.

7. The column of claim 1, in which the lower half of the downcomer further comprises vertical plates spaced apart from each other and arranged parallel to the width of the downcomer.

8. The column of claim 7, in which the length of the downcomer as measured at tray level is more than 0.5 m.

9. The column of claim 8, wherein the downcomer is provided with a rectangular shaped baffle vertically positioned in the opening of the downcomer, extending to between 30 and 70% of the tray spacing above the tray level.

10. The column of claim 9, in which the baffles are supported by vertical plates spaced apart from each other and arranged parallel to the width of the downcomer and positioned in the lower half of the downcomer.

11. The column of claim 10, wherein the tray diameter is more than 2 meters and in which the column further comprises a supporting beam along the diametrical line.

12. The column of claim 11, in which the column is a distillation column or an absorption column.

* * * * *